(12) United States Patent
Dmitriev et al.

(10) Patent No.: US 10,482,064 B2
(45) Date of Patent: Nov. 19, 2019

(54) DE-DUPLICATING IMMUTABLE DATA AT RUNTIME

(75) Inventors: Mikhail A. Dmitriev, Campbell, CA (US); Nathan L. Reynolds, Mesa, AZ (US); Oleksandr Otenko, Winnersh (GB)

(73) Assignee: Oracle International Corporations, Redwood City, CA (US)

( * ) Notice: Subject to any disclaimer, the term of this patent is extended or adjusted under 35 U.S.C. 154(b) by 787 days.

(21) Appl. No.: 13/533,306

(22) Filed: Jun. 26, 2012

(65) Prior Publication Data

US 2013/0346376 A1    Dec. 26, 2013

(51) Int. Cl.
G06F 16/10 (2019.01)
G06F 16/174 (2019.01)

(52) U.S. Cl.
CPC .................. *G06F 16/174* (2019.01)

(58) Field of Classification Search
None
See application file for complete search history.

(56) References Cited

U.S. PATENT DOCUMENTS

| | | | |
|---|---|---|---|
| 6,516,321 B1* | 2/2003 | De La Huerga | |
| 7,899,796 B1* | 3/2011 | Borthwick et al. | 707/692 |
| 8,140,491 B2 | 3/2012 | Mandagere et al. | |
| 8,140,821 B1* | 3/2012 | Raizen et al. | 711/202 |
| 8,190,850 B1* | 5/2012 | Davenport | G06F 17/30067 711/170 |
| 8,281,293 B2* | 10/2012 | Fulton | G06F 9/4435 707/999.206 |
| 8,407,438 B1* | 3/2013 | Ranade | 711/165 |
| 8,468,138 B1* | 6/2013 | Chhaunker | G06F 17/30194 707/654 |
| 8,578,112 B2* | 11/2013 | Tashiro | 711/162 |
| 8,615,500 B1* | 12/2013 | Armangau et al. | 707/693 |
| 2012/0136906 A1* | 5/2012 | Burka | G06F 12/0253 707/813 |

OTHER PUBLICATIONS

"Memory Deduplication as a Threat to the Guest OS" by Suzaki, et al. Published in: EUROSEC '11 Proceedings of the Fourth European Workshop on System Security, Article No. 1, ACM New York, NY, USA (© 2011).
"The Effectiveness of Deduplication on Virtual Machine Disk Images" by Jin, et al, (May 2009).
"A Quantitative Analysis of Space Waste from Java Strings and its Elimination at Garbage Collection Time" by Kawachiya, et al. (Sep. 7, 2007).
"KSM++: Using I/O-based hints to make memory-deduplication scanners more efficient".

* cited by examiner

*Primary Examiner* — Jau Shya Meng
(74) *Attorney, Agent, or Firm* — Robert C. Kowert; Meyertons, Hood, Kivlin, Kowert & Goetzel, P.C.

(57) ABSTRACT

De-duplication of immutable data items at runtime may include identifying a set of potentially duplicate immutable data items in use by one or more applications. The applications may access the immutable data items through pointers of respective objects corresponding to the immutable data items. A de-duplication component executing distinctly from the applications may analyze the identified set of potentially duplicate immutable data items to determine two or more that have identical content and may then modify one or more pointers of the corresponding objects so that at least two of the pointers point to a single immutable data item.

20 Claims, 8 Drawing Sheets

FIG. 1

FIG. 2 performing histogram analysis on the immutable data items using partial identifiers of the immutable data items, where each histogram bucket corresponds to a different candidate group of potentially duplicate immutable data items, and where all the immutable data items of a candidate group have the same partial identifier
300 sorting the resulting candidate groups according to the combined size of the immutable data items in each candidate group
310 selecting one or more candidate groups for de-duplication analysis based on a predetermined threshold, where the combined size of the selected candidate groups is above the predetermined threshold
320

FIG. 3 histogram
400

410   420   430

| Partial Identifier | # of Items | Total Size |
|---|---|---|
| 'a', 10 | 7 | 102 |
| 'h', 35 | 2 | 89 |
| 'e', 12 | 10 | 120 |
| 's' 25 | 11 | 175 |
| 't', 17 | 8 | 136 |

FIG. 4 sorted histogram
500

| Partial Identifier | # of Items | Total Size |
|---|---|---|
| 's' 25 | 11 | 175 |
| 't', 17 | 8 | 136 |
| 'e', 12 | 10 | 120 |
| 'a', 10 | 7 | 102 |
| 'h', 35 | 2 | 89 | selected entries 510 (top two rows)

discarded entries 520 (bottom three rows)

DE-DUPLICATING IMMUTABLE DATA AT RUNTIME

BACKGROUND

Description of Related Art

In computer programming, modern computer applications may consume excessive amounts of memory. It is not uncommon to see deployed server applications consuming many gigabytes of memory to support relatively small numbers of users.

One potential cause of excessive memory consumption is unintended data duplication. For example, strings may collectively consume a large fraction of an application's memory. In business applications strings frequently come from database and user input. When information is read from these sources, new memory may be allocated to store the input. Information typically contained in business databases, such the names of cities, streets or people, may be quite repetitive possibly resulting in multiple instances of duplicate data in memory. There may be other sources of data duplication as well.

Table 1 below, illustrates the results of string duplication analysis for three applications and the amount of memory overhead caused by data duplication (in this case duplication of strings). Overhead may be defined as the amount of memory that could be saved if only a single instance of each unique string were retained. In one instance, analysis of application memory usage, including analysis of heap dumps, illustrates duplicate data taking up to 16 percent of total heap size and that may take up to 70 percent of stored data. The results shown in Table 1 represent merely one example and analysis of other systems and applications may reveal different results.

TABLE 1

|  | Heap Size (MB) | # Objects (millions) | Size of all Strings (MB) | Number of Strings (millions) | # Unique Strings (millions) | Overhead (MB) |
|---|---|---|---|---|---|---|
| App 1 | 873 | 11.5 | 206 | 1.6 | 0.361 | 146 (16% of heap, 70% of strings) |
| App 2 | 362 | 8.0 | 99 | 1.0 | 0.319 | 54 (15% of heap, 55% of strings) |
| App 3 | 3000 | 47.0 | 518 | 5.5 | 2.300 | 250 (8% of heap, 48% of strings) |

As noted above, data duplication, such as caused by storing multiple copies of the identical string content, may result in significant memory overhead. Specialized data tables, such as Java-based intern tables (e.g., as maintained by the String.intern( ) method in Java), may prevent data duplication. Such specialized tables may map multiple instances of objects referencing duplicate data items to a single unique instance and provide that unique instance for use in other parts of application code.

However, it may be difficult to identify a proper place in an application's code to insert calls to specialized table functionality. For example, data may be allocated within third party libraries, or other low level code that cannot be easily modified to take advantage of the specialized table functionality. In addition, modifying application code in multiple places to refer to such a specialized table may cause the source code to be unnecessarily obfuscated or brittle.

Furthermore, using a specialized table may also consume additional memory. Accessing such a specialized table for data that was not actually duplicated may also consume unnecessary processor time and increase the size of the specialized table. Specialized data tables may end up storing data after that data is no longer referenced by the application that created it, thus creating the need for additional cache eviction schemes (such as by use of Java WeakReferences, for example) or other specialized garbage collection techniques that must be implemented within the application. Furthermore, such specialized table techniques may not be able to easily handle high concurrency or scaling issues.

SUMMARY

The systems and methods described herein demonstrate a variety of techniques for de-duplication of immutable data items at runtime. For example, a de-duplication component may be configured to identify a set of potentially duplicate immutable data items, analyze those potentially duplicate data items to determine two or more that have identical content and then modify one or more pointers to the duplicate data items so that at least two of the pointers point to a single immutable data item, according to one embodiment.

De-duplication of immutable data items at runtime may be implemented, as described herein, by a de-duplication component that executes as a system-level component, rather than as part of any particular application that allocates and uses the data items being de-duplicated. For example, in some embodiments, a de-duplication component may execute within a virtual machine, such as a Java Virtual Machine, and may be configured to de-duplicate immutable data items used by applications executing either within the same virtual machine or within one or more other virtual machines. In another example, a de-duplication component may execute as a system level component of a computer system that does not utilize virtual machines and de-duplicate immutable data items used by applications executing on that computer system.

While in some embodiments, de-duplication of immutable data items may always be performed, in other embodiments, the techniques described herein may be performed optionally and may only be activated for applications as desired. For instance, de-duplication of immutable data items may be initiated in response to offline measurement and analysis of memory consumption.

In some embodiments, the techniques for de-duplication of immutable data items at runtime, as described herein, may be configured to minimize the memory overhead of a de-duplication mechanism. For example, in one embodiment, a de-duplication mechanism may analyze and/or de-duplicate only a portion of the total potential duplicated immutable data items, possibly leaving some instances of duplicated data items. For example, in some embodiments, remaining unanalyzed and potentially duplicated immutable data items may have a relatively small impact on overall memory usage. In other embodiments, however, a de-duplication mechanism may analyze and/or de-duplicate all potentially duplicated immutable data items.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

De-duplication of immutable data at runtime may, as described here and according to various embodiments include one or more applications executing on a computer system, where the applications include a plurality of objects each of which correspond to a respective immutable data item, and where each object includes a pointer to the respective immutable data items.

Figure 1:
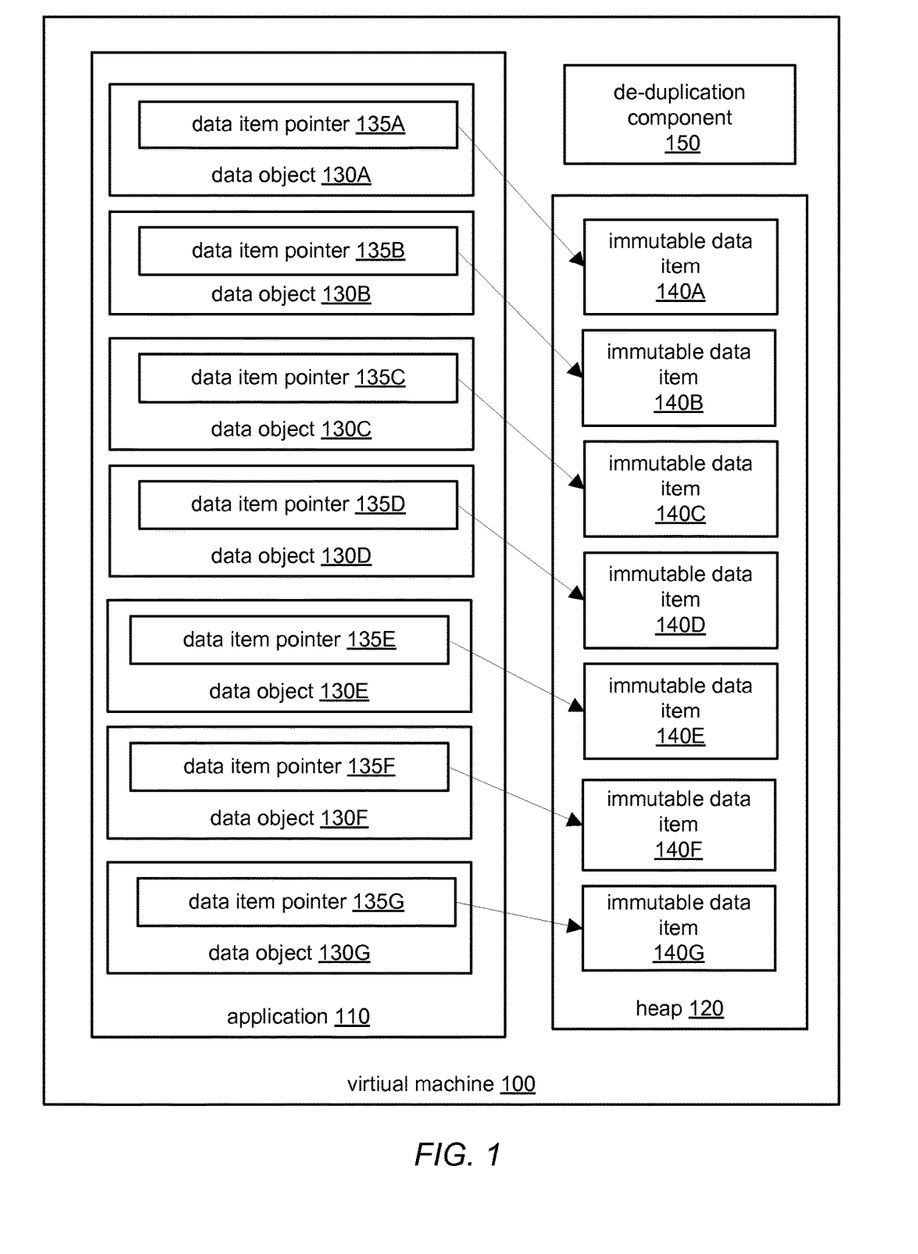
FIG. 1 is a logical block diagram illustrating, according to one embodiment, a virtual machine including a de-duplication component configured to implement de-duplication of immutable data items in the virtual machine at runtime.

FIG. 1 illustrates one embodiment of an environment in which may be implemented de-duplication of immutable data at runtime, as described herein. In one embodiment, a de-duplication component, such as de-duplication component 150, may execute within a virtual machine, such as virtual machine 100, and may de-duplicate immutable data items, such as immutable data items 140A-140G in heap 120. The immutable data items may be used by one or more applications, such as application 110, executing in the virtual machine 100. Application 110 may, in some embodiments, create one or more data objects, such as data objects 130A-130G in order to access the immutable data items. Each data object may include a pointer, such as data item pointers 135A-135G, through which to access the contents of a respective immutable data item. In some embodiments, de-duplication component 150 and application 110 may execute within a single virtual machine instance. In other embodiments, however, de-duplication component 150 may execute within a separate virtual machine instance from that in which application 110 executes.

Please note that FIG. 1 illustrates a logical arrangement of data displaying data objects 130A-130G as included within application 110, it should be noted that data objects 130A-130G may be created within heap 120 by application 110, in some embodiments. Furthermore, while described and illustrated herein with reference to immutable data within a virtual machine, de-duplication of immutable data at runtime, as described herein, may also be performed on computer systems without virtual machines.

According to various embodiments, an immutable data item may be a set of data which is not directly modifiable during the lifetime of an object used to access that data. For example, in a Java-based system, a string may be considered immutable since the content of the string is not changed without creating a new String object for the newly changed content. Immutability may, in some embodiments, be implemented via data objects, such as Java String objects, that encapsulate the data content to ensure the immutable nature of the content.

In different embodiments, different and various mechanisms may be utilized to ensure the immutable nature of the data items being de-duplicated. In some embodiments, de-duplication component 150 may rely on features of the underlying system or development environment to ensure that the data being de-duplicated is immutable. In one embodiment, de-duplication component 150 may take advantage of the manner in which data objects are implemented. For example, the Java Development Kit (JDK) class library may implement a java.lang.String class such that a String object is not an "alias" to a character array, but rather includes a pointer to a character array storing the actual string content. Thus, in one embodiment, de-duplication component 150 may rely on a particular implementation of the objects referencing and accessing immutable data items to ensure the immutable nature of the data being de-duplicated, such as illustrated by the example Java String class definition below:

```
public class String {
    private char[ ] value;      // Character storage -
                                // may be longer than actual string
    private int offset, count;  // Starting index into 'value' and
                                // length of string contents
```

In some embodiments, de-duplication component 150 may only need to change an internal pointer encapsulated within a data object, such as a java.lang.String object described above, to point to a different immutable data item in order to de-duplicate the immutable data item, without disturbing the application's usage of the data object referencing the de-duplicated data item. In contrast, if a data object encapsulates its contents directly (for example, in some languages plain character arrays are treated as strings), data item de-duplication might require replacing pointers to multiple duplicated data items (i.e., multiple character arrays with identical content) with a pointer to a single unique data item (e.g., a single character array).

In some embodiments, de-duplication may be performed only on immutable data items for which a change in basic identity may not be detectable by application code accessing those data items. For example, in the Java String example discussed above, String.value is declared private, thus limiting its use to the methods of class String. Thus, it may be verified that String.value is immutable since the methods of class String never modify the contents of the char[ ] after being created in the String constructor. Therefore, application code using Java String objects may not detect any change in the basic identity of the underlying char[ ] (e.g., the String.value member) since they are not accessing the char[ ] directly, but instead are using the String methods. As another example, a package-private constructor of a String class may accept a char[ ] from the caller without making a copy of the passed char[ ] and de-duplication component 150 may only perform de-duplication analysis on the underlying char[ ] (i.e., as an immutable data item) if it is verifiable that no members of the same package modify the char[ ] directly after passing to the String constructor.

Thus, in the Java String example discussed above, changing the char[ ] member (such as when de-duplicating string data) may not be detectable to application code using the String objects, while updating String objects themselves may be detectable, and therefore String objects may not be de-duplicated.

Verifying that changes to immutable data items due to de-duplication are not detectable by application code, and thus that de-duplication may be performed on those immutable data items, may be performed in various manners, according to different embodiments. For instance, it may be verified that immutable data items are not used as synchronization objects and/or that immutable data item references are not compared to other references. In other words, in some embodiments, de-duplication component 150 may be configured to only apply de-duplication analysis to immutable data items for which it is verifiable that changing the basic, underlying identity of the immutable data items will not be noticed by application code.

Furthermore, in some embodiments, de-duplication may be considered only for data items (e.g., member variables) for which it can be verified that no modification of access restrictions has occurred at runtime. For instance, in a Java based system, de-duplication component 150 may rely on the Java Virtual Machine's knowledge to determine which data items to consider for de-duplication. For example, if a line of code in a particular class violates the immutability assumption of Java (such as by creating reflection accessors) then de-duplication may not be considered for objects of that particular class at run-time. In other words, if de-duplication component 150 determines that access restrictions are modified for a set of immutable data objects and/or that other code accesses the immutable data items via reflection, de-duplication component 150 may not perform de-duplication analysis for those immutable data items, according to some embodiments.

In other embodiments however, de-duplication component 150 may be configured to ignore whether or not access restrictions are modified for a set of immutable data objects and that other code accesses the immutable data items via reflection and perform de-duplication analysis on those immutable data items. For example, de-duplication component 150 may be configured to ignore reflection-based access of immutable data items because code using such reflection-based access may already violate an intended, designed or assumed immutability of data items.

Please note that while described herein using examples based on strings, such as the java.lang.String class above, de-duplication of immutable data items at runtime may be utilized to de-duplicate various types of data, not just strings and not merely in Java-based systems. De-duplication of immutable data objects at runtime may be implemented on virtually any type of immutable data, in various embodiments.

In some embodiments, a de-duplication component, such as de-duplication component 150, may de-duplicate one or more immutable data items, such as immutable data items 140A-140G, as part of a garbage collector. In one embodiment, de-duplication of immutable data items may be performed as part of a mark-and-compact garbage collection cycle, such as by being performed as an initial step before other garbage collection is performed. In other embodiments, however, de-duplication, as described herein, may be performed separately and independently of garbage collection. For example, a de-duplication process may be executed by de-duplication component 150 in between garbage collection cycles, such as by executing during spare CPU cycles and between individual invocations of garbage collection. In some embodiments, performing de-duplication independently of, and perhaps between, garbage collection cycles, may prevent the need to modify or adapt the de-duplication process to different garbage collection algorithms (such as a garbage-first collector, among others), and may also avoid unnecessary increases in garbage collection execution times.

In some embodiments, de-duplication of immutable data items in a virtual machine at runtime may be considered in two phases; a mark phase and a sweep phase for example. During a mark phase, de-duplication component 150 may build a data histogram to analyze the immutable data items for possible de-duplication, such as to identify a particular set of potentially duplicate immutable data items for further de-duplication analysis, as in one embodiment. Additionally, during a sweep phase, the identified set of potentially duplicate immutable data items may be further analyzed to identify those immutable data items with duplicate content and for de-duplication. The mark and sweep phases mentioned above are merely logical divisions between different steps or functions of the de-duplication mechanism described herein. In various embodiments, the steps and functions of de-duplication of immutable data items at runtime may be performed in a different order with or without reference to separate mark and sweep phases.

As noted above, in some embodiments, de-duplication of immutable data items at runtime may be performed between garbage collection cycles, and may also ensure that immutable data items (as well as possibly data objects and data pointers that reference those immutable data items) are not relocated or removed while de-duplication of the data items is in progress. In some embodiments, de-duplication component 150 may rely upon mechanisms and/or features of the development or execution environment (e.g., such as the system on which a virtual machine is implement or executed) to ensure that the immutable data items to be de-duplicated are not moved or deleted during a de-duplication process. For example, in one embodiment, de-duplication component 150 may rely on a generational heap structure to help ensure that immutable data objects are not moved or removed during de-duplication. For instance, de-duplication component 150 may de-duplicate immutable data items stored in older generational areas, such as where relatively longer-lived data objects and data items may be stored and which may be garbage collected less frequently, as opposed to de-duplicating immutable data items in newer generational areas, which may be more likely to store more temporary data items, and which may be garbage collected more frequently, according to one embodiment.

In other embodiments however, de-duplication component 150 (or another component) may utilize another mechanisms to ensure the stability of the immutable data items during de-duplication (i.e., that the data items are not relocated, moved or deleted during de-duplication). For instance, in one embodiment, de-duplication component 150 may use semaphores or other data locks to ensure the stability of immutable data items during de-duplication. In another embodiment, de-duplication component 150 may take advantage of system-specific or application-specific knowledge to ensure the stability of immutable data items during de-duplication.

As noted above, a de-duplication component, such as de-duplication component 150, may ensure that a de-duplication process is completed between garbage collection invocations. In other embodiments, de-duplication component 150 may be configured to recognize impending garbage collection and stop de-duplication before the garbage collection cycle begins. When recognizing that a garbage collection cycle is about to begin, de-duplication component 150 may abandon, reverse or otherwise clean up, any partially performed de-duplication of immutable data items before the next garbage collection cycle begins, according to one embodiment.

In some embodiments, de-duplication component 150 may avoid using any permanent data structures (i.e., global data instance tables, string tables, etc that persist between successive de-duplication processes) and instead may use only temporary structures that may be created, used and deleted during each de-duplication process (and thus such temporary structures may not be in memory during garbage collection and may not take up heap space except during de-duplication). By avoiding the use of permanent data structures, de-duplication component 150 may, according to some embodiments, be able to conserve memory and CPU usage.

In other embodiments, however, de-duplication component 150 may utilize more permanent or persistent data structures, such as when conserving memory and CPU usage is not as critical, or to store information from one de-duplication process to another. For example, in one embodiment, de-duplication component 150 may keep a table, list or other structure noting information about which immutable data items have been de-duplicated so as to possibly avoid attempting to de-duplicate the same immutable data items unnecessarily in a future de-duplication process.

Figure 2:
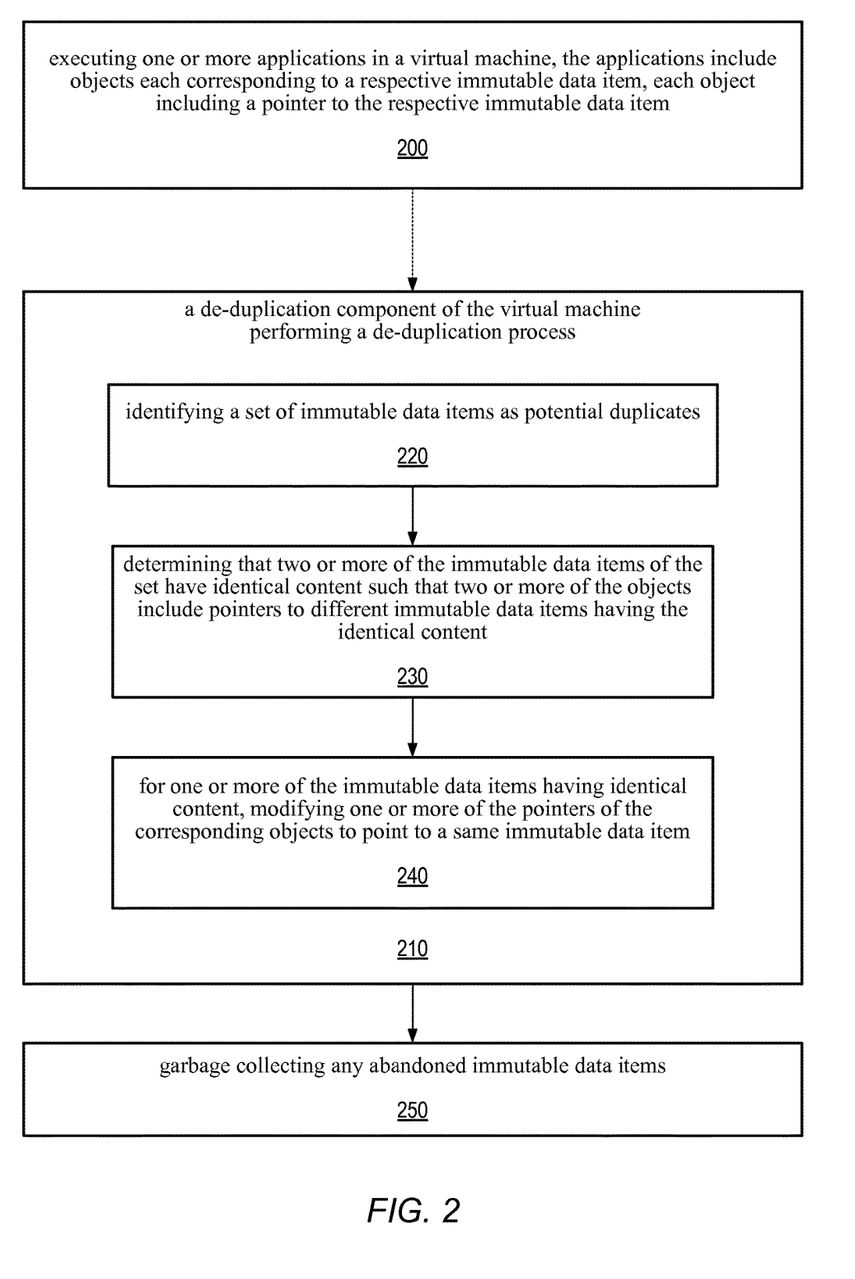
FIG. 2 is a flow diagram illustrating one embodiment of a method for de-duplication of immutable data items at runtime.

FIG. 2 illustrates one embodiment of a method for implementing de-duplication of immutable data items at runtime, as described herein. As shown in block 200 according to one embodiment, a system implementing de-duplication of immutable data items at runtime may execute one or more applications, where the applications may include a plurality of objects each corresponding to a respective immutable data item and where each object includes a pointer to the respective immutable data item. For example, as described above in reference to FIG. 1 and according to one embodiment, application 110 may execute within virtual machine 100 and may include data objects 130A-130G that correspond respectively to immutable data items 140A-140G. In addition, each of data objects 130A-130G may, as in the embodiment illustrated by FIG. 1, include a data item pointer (e.g., data item pointers 135A-135G) that points to the respective immutable data item.

As shown in block 210, a de-duplication component of the virtual machine, such as de-duplication component 150, may perform a de-duplication process that may include various processes, steps or functions, as illustrated by the blocks within block 210, and according to one embodiment. In one embodiment, a de-duplication process, may include identifying a set of immutable data items as potential duplicates, as in block 220. De-duplication component 150 may identify a set of immutable data items as potential duplicates in various ways, according to different embodiments. For example, in one embodiment, de-duplication component 150 may perform histogram analysis on the immutable data items using partial identifiers for the immutable data items, as will be described in more detail below in reference to FIG. 3. In other embodiments, other methods of identifying potentially duplicate immutable data items may be used.

In some embodiments, identifying potentially duplicate immutable data items may include analyzing the immutable data items to determine a set of items that when de-duplicated may provide a large potential gain in terms of recovered memory space for a smaller amount of effort compared to the effort of de-duplicating all potentially duplicate immutable data items. In other words, de-duplication component 150 may utilize various strategies and/or methods to minimize the number of immutable data items to analyze while attempting to maximize the potential gain resulting from de-duplication.

In one embodiment, de-duplication component 150 may identify immutable data items that were not analyzed in recent previous de-duplication cycles or processes. For instance, de-duplication component 150 may maintain a record of which immutable data items were de-duplicated, or at least analyzed for de-duplication recently, and not identify those immutable data items for de-duplication analysis on subsequent de-duplication cycles (or at least not until other immutable data items have been analyzed more recently or until a predetermined amount of time has passed).

Figure 3:
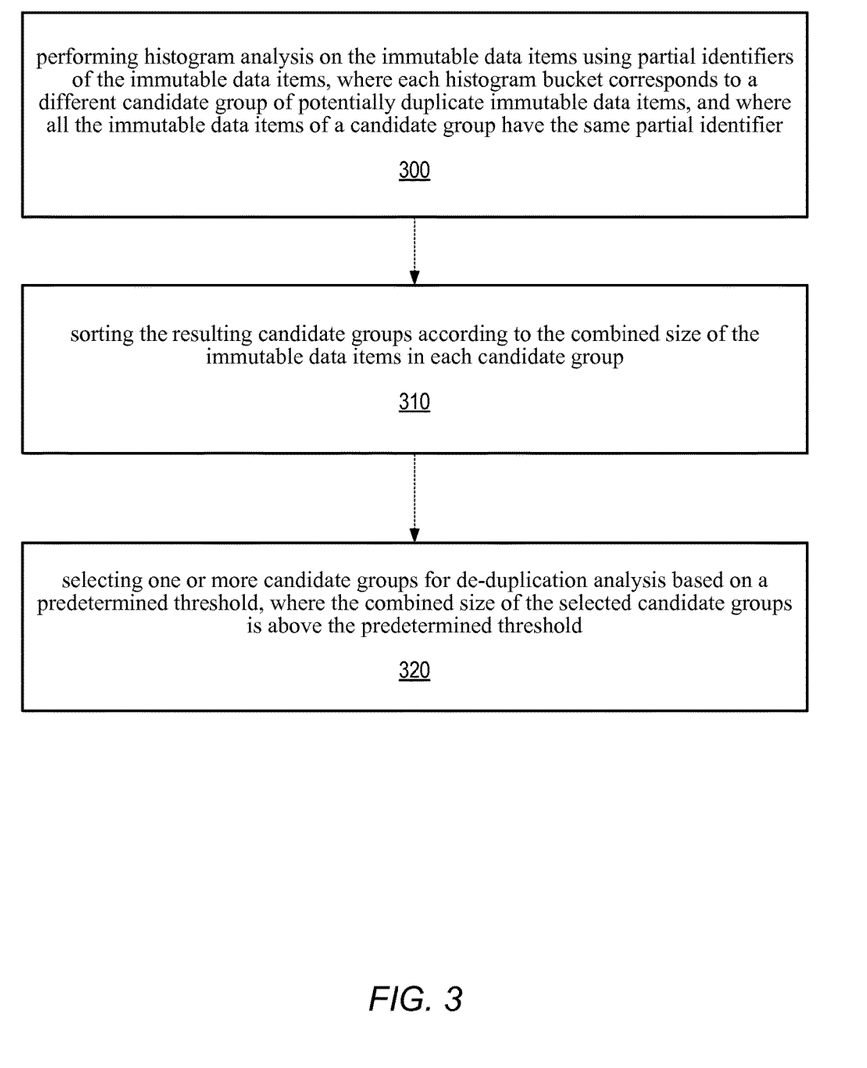
FIG. 3 is a flow diagram illustrating one embodiment of a method for selecting candidate groups of potentially duplicate immutable data items for de-duplication based on a predetermined threshold.

FIG. 3 illustrates one embodiment of a method for identifying a set of immutable data items as potential duplicates. As shown in FIG. 3, de-duplication component 150 may perform histogram analysis on the immutable data items using partial identifiers of the immutable data items where each histogram bucket corresponds to a different candidate group of potentially duplicate immutable data items and where all the immutable data items of a candidate group have the same partial identifier, as shown in block 300.

Partial identifiers used by de-duplication component 150 may be of various types and forms in different embodiments. For example, in one embodiment, de-duplication component 150 may generate for each immutable data item a partial identifier that includes a first character and a length of the immutable data item content. Thus, if an immutable data item has the content "Anna", de-duplication component 150 may generate a partial identifier that includes the character 'A' and the length 4, according to one embodiment. Partial identifiers may identify a candidate group of immutable data items that may not all be duplicates of each other. For instance, using partial identifiers that include a first character and a length may result in both "Anne" and "Anna" (or any other strings whose contents have a similar length and start with the same first character) being included in the same candidate group of potentially duplicate immutable data items.

In other embodiments however, different partial identifiers may be used as part of identifying a set of immutable data items as potential duplicates. For instance, in one embodiment a hash function may be applied to the immutable data items and the resulting hash values may be used as a partial identifier. In another embodiment, only a portion of the resulting hash values may be used as partial identifiers. In yet other embodiments, de-duplication component 150 may take advantage of other existing information about the immutable data items when generating partial identifiers. For example, hash values (or other meta-data) may already exist for the immutable data items (such as may be created by application 110 or another component of virtual machine 100) and de-duplication component 150 may use the existing information, or a portion of the existing information, as partial identifiers.

When using partial identifiers, de-duplication component 150 may, in some embodiments, be able to analyze immutable data items faster than when analyzing the entire content of the immutable data items and may also be able to use smaller tables (or other structures) during de-duplication analysis.

Figure 4:
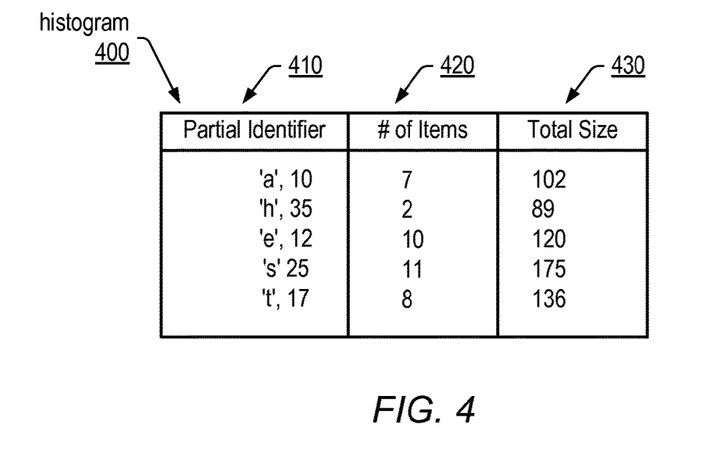
FIG. 4 is a logical block diagram illustrating, according to one embodiment, a histogram resulting from performing histogram analysis of immutable data items, as described herein.

As noted above, de-duplication component 150 may construct a histogram, such as histogram 400 illustrated in FIG. 4, for use in identifying a set of immutable data items as potential duplicates. Histogram 400 may include information used during de-duplication analysis of the immutable data items, according to various embodiments. For example, histogram 400 may include column 410 representing partial identifiers of the potentially duplicate immutable data items, column 420 representing the number of potentially duplicate immutable data items corresponding to each partial identifier, and column 430 representing the combined size of all potentially duplicate immutable data items corresponding to each partial identifier. Thus, in the embodiment shown in FIG. 4, each row of histogram 400 represents a different candidate group of potentially duplicate immutable data items, as described above.

Figure 5:
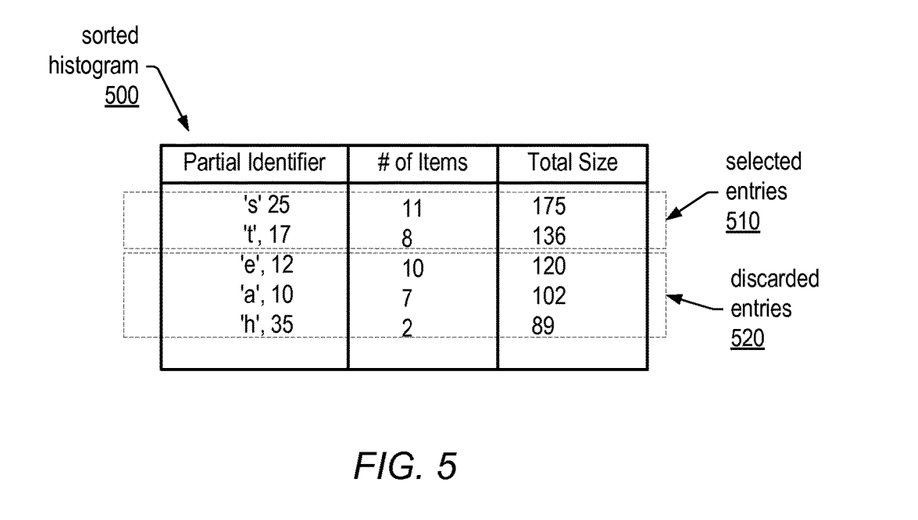
FIG. 5 is a logical block diagram illustrating one embodiment of a sorted histogram including selected and discarded candidate groups of potentially duplicate immutable data items, as described herein.

Referring back to block 310 of FIG. 3, identifying a set of immutable data items as potential duplicates may include sorting the resulting candidate groups according to a combined size of the immutable data items in each candidate group, according to one embodiment. For example, de-duplication component 150 may sort histogram 400 according to the values in column 430 (e.g., Total Size), resulting in sorted histogram 500, illustrated in FIG. 5. As shown in FIG. 5, histogram rows, each of which may represent a different candidate group of potentially duplicate immutable data items, may be re-ordered so that the candidate groups representing the largest overall memory usage, and which may represent the largest potential benefit from de-duplication may be grouped together. In other embodiments, however, other sorting mechanisms and styles may be utilized.

Referring back to block 320 of FIG. 3, de-duplication component 150, as part of identifying a set of immutable data items as potential duplicates, may select one or more candidate groups for further de-duplication analysis based on a predetermined threshold, where the combined size of the selected candidate group is above the predetermined threshold, according to one embodiment.

In some embodiments, one or more candidate groups may be selected for de-duplication analysis based on previous analysis of data usage on a particular system. For example, analysis may have shown that the overhead of duplicated strings (such as in a Java-based system) may vary between 50 and 70 percent of the total overhead of all strings (i.e., both duplicated and unique strings) and thus a predetermined threshold of 50 percent of the combined size of all immutable data items may be used as part of the de-duplication process. Thus, in one example embodiment, a de-duplication component may select one or more candidate groups for de-duplication analysis such that the combined total size of the immutable data items in the selected candidate groups corresponds to 50 percent of the total combined size of the immutable data items in all the candidate groups.

Referring to FIG. 5, de-duplication component 150 may analyze the candidate groups (e.g. the rows) in sorted histogram 500 and select the first two candidates groups, represented by selected entries 510 which together correspond to 50 percent of the total combined size of all the candidate groups, as one example. Please note that in some embodiments, the total size of the immutable data items in the selected candidate groups may not equal exactly 50 percent of the total size of all the candidate groups and that a percentage range or other tolerance value(s) may be used instead of, or in addition to, a single predetermined threshold.

While described above according to one embodiment as selecting one or more candidate groups for de-duplication analysis based on the combined size of the selected candidate group being above a predetermined threshold, in other embodiments, various types of predetermined thresholds and other methods of using a predetermine threshold may be utilized. In one embodiment, de-duplication component 150 may determine a maximum of immutable data items to be analyzed for de-duplication within the amount (or size) of heap memory available to the de-duplication process. For example, a maximum size of the total immutable data items for each candidate group may be calculated and thus a total amount of memory required for all immutable data items if there were no duplicates within a candidate group, may be compared to an amount of heap memory available for de-duplication analysis. Thus, in one embodiment, sorted histogram 500 and/or selected entries 510 may be truncated, culled, or otherwise adjusted based on an amount of memory available for de-duplication analysis and in view of the combined size of selected candidate groups.

While selecting candidate groups is described above in terms of the total size of immutable data item content, in other embodiments, other data and data comparisons may be used. For example, de-duplication component 150 may select one or more candidate groups based on a comparison of a total number of immutable data items (rather than total size) in the selected candidate groups as a ratio of the total number immutable data items in all candidate groups. In other words, in some embodiments, a percentage of the total immutable data items may be used as a predetermined threshold when selecting one or more candidate groups for de-duplication analysis.

In some embodiments, the predetermined threshold used as part of selecting a set of candidate groups for de-duplication analysis may be configurable, either prior to or during execution of a de-duplication component. For example, in one embodiment, a system administrator or other user may analyze duplicate data overhead or results from the de-duplication of immutable data items in a virtual machine and set or adjust the predetermined threshold based on that analysis. In other embodiments, de-duplication component 150 may be configured to adjust the predetermined threshold based on results from previous de-duplication of the immutable data items in the virtual machine. In yet other embodiments, de-duplication component 150 may be configured to accept user input that defines or adjusts a predetermined threshold to be used when selecting a set of candidate groups for de-duplication analysis.

While mainly described above as selecting only a subset or portion of the potential candidate groups for de-duplication analysis, in some embodiments, all candidate groups, and therefore all potentially duplicate immutable data items, may be selected for de-duplication analysis. In other words, while in some embodiments, de-duplication component 150 may only analyze and de-duplicate a potion of the immutable data items stored in heap 120, in other embodiments, de-duplication component 150 may analyze and potentially de-duplicate all immutable data items in heap 120.

A de-duplication process may also include, as shown in block 230 of FIG. 2, determining that two or more of the immutable data items of the selected set have identical content such that two or more of the plurality of objects comprise pointers to different immutable data items having identical content. In some embodiments, determining whether or not two or more immutable data items have identical content may involve first checking a partial identifier corresponding to the potentially duplicate immutable data item against the selected candidate groups from a histogram. For example, referring to FIG. 6, de-duplication component 150 may determine a partial identifier for a potentially duplicate immutable data item, as shown in block 600 and may then determine whether the partial identifier is one of those selected for de-duplication analysis, as shown in block 610, according to one embodiment.

Figure 6:
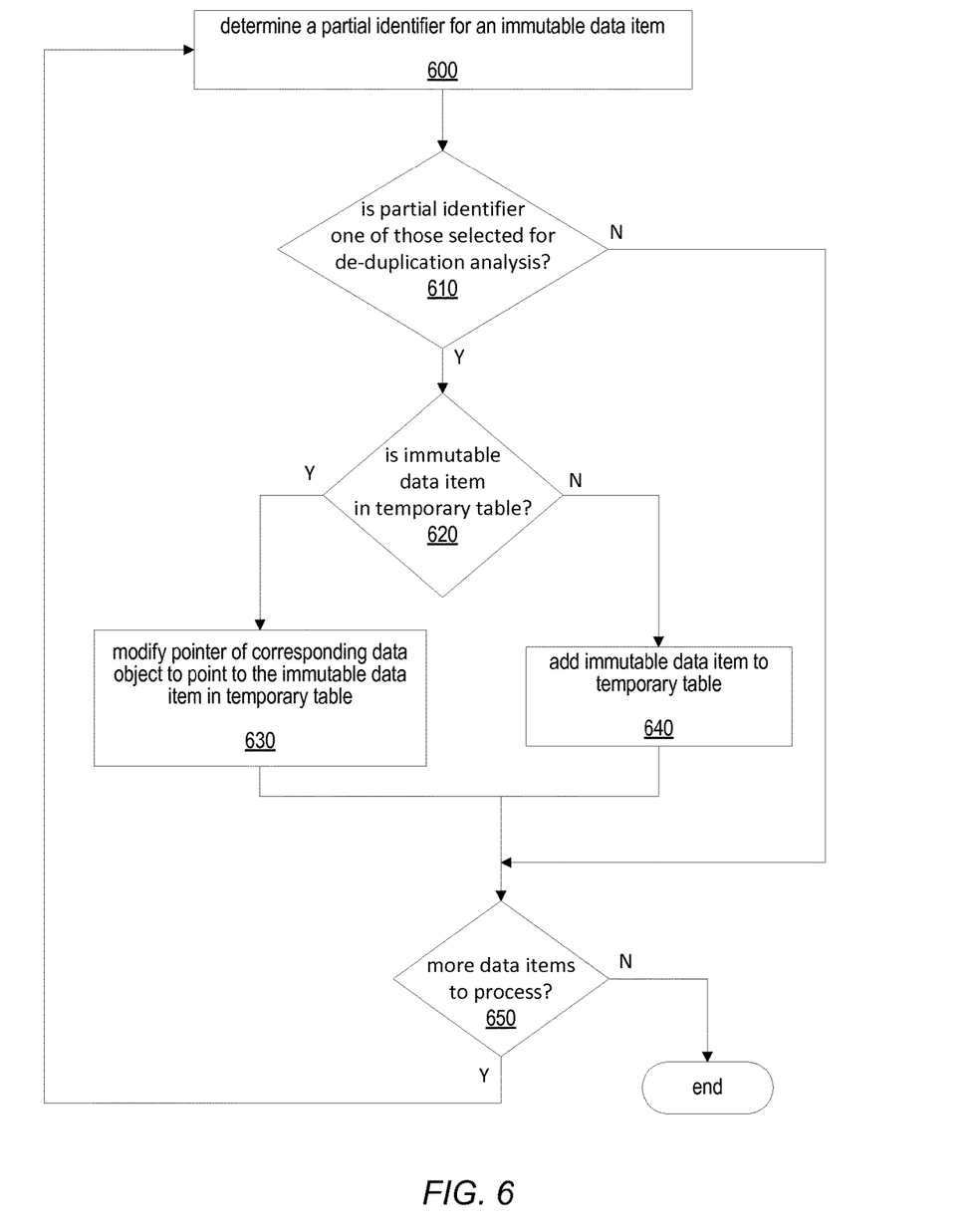
FIG. 6 is a flow diagram illustrating one embodiment of a method for performing de-duplication analysis by a de-duplication component at runtime, as described herein.

In some embodiments, a de-duplication component may first check to see if the partial identifier corresponds to one of the selected candidate groups from the histogram. For example, in one embodiment using a first character and length as a partial identifier it may be faster to compare the first character and length of a potentially duplicate immutable data item to the respective first characters and lengths of the selected candidate groups, and only perform a more lengthy data content comparison of those immutable data items that match one of the candidate groups. If the partial identifier for a potentially duplicate immutable data item does not correspond to one of the selected candidate groups, the immutable data item may be ignored and not analyzed further for de-duplication, as represented by the negative output of block 610, according to one embodiment.

Thus, in some embodiments, determining whether the partial identifier corresponds to one of the selected candidate groups may save unnecessary processing time by avoiding more costly data comparisons to determine data duplication of potentially duplicate immutable data items not corresponding to any of the candidate groups selected for de-duplication analysis.

In some embodiments, a temporary table may be generated to store individual immutable data items during de-duplication. For example, in an embodiment configured to de-duplicate strings in a Java-based system, a temporary String table may be created and potentially duplicate strings (i.e., potentially duplicate immutable data items) may be compared to strings in the temporary String table.

Thus, if a partial identifier corresponds to one of the selected candidate groups, a de-duplication component may determine whether the immutable data item is in a temporary table, as shown in block 620, according to one embodiment. In one embodiment, de-duplication component 150 may determine that two or more immutable data items have identical content during a sweep phase of a de-duplication process, such as after a mark phase of the de-duplication process. In other embodiments, however, de-duplication component 150 may determine that two or more immutable data items have identical content without specifically using a separate sweep phase.

If the immutable data item is not already in the temporary table, as indicated by the negative output of block 620, the immutable data item may be added to the temporary table as shown in block 640, according to some embodiments. For example, in one embodiment, a potentially duplicate string may be compared to other strings in a temporary string table and if the table does not already have a string with the same content, the candidate string may be added to the table.

Referring back to the embodiment illustrated in FIG. 2, a de-duplication process may, as shown in block 240, include modifying, for one or more of the immutable data items having identical content, one or more of the pointers of the corresponding objects to point to the same immutable data item.

Referring now to FIG. 6, if the immutable data item is already in the temporary table, as represented by the positive output of block 620, a de-duplication component may modify a pointer of a corresponding object to point to the immutable data item in the temporary table, as shown in block 630, according to one embodiment. For example, if a potentially duplicate string is compared to the strings in a temporary string table and it is found a string with identical content already exists in the table, a pointer to the potentially duplicate string (e.g., a pointer in String object) may be modified to point to the same string content (i.e., the same underlying char array) of the string already in the table.

In some embodiments, de-duplication component 150 may only need to update or modify a single pointer in order to de-duplicate a duplicate immutable data item. In other embodiments, however, immutable data items may be encapsulated in various manners, including the use of other data or metadata about the immutable data items. For example, in the particular Java String class definition described above, a string object may include an offset and a length as well as a pointer to the content of the string. Thus, in some embodiments, modifying a pointer of an object to point to a different immutable data item may include updating additional data or metadata as well. For instance, in an embodiment where Java-based strings are being de-duplicated, de-duplication component 150 may be configured to modify a length and an offset as well as a pointer as part of modifying a pointer of an object to point to a different immutable data item.

In some embodiments, updating data or metadata about immutable items (e.g., other than a single pointer) may include use of various mechanisms to ensure that the applications using the immutable data items are not affected by de-duplication of those immutable data items. In one embodiment, de-duplication component 150 may rely on mechanisms implemented by other system components, such as a garbage collector. For example, a garbage collector (and/or de-duplication component 150) may suspend various application threads at code locations which ensure that data or metadata about immutable items is able to be updated without affecting the application using those immutable data items. Thus, particular locations may be identified as safe-points for a garbage collector (and/or de-duplication component 150) to suspend application threads in order to perform de-duplication. Such safe-points may, in some embodiments, be located in class methods at code locations where there exist no thread-local references to the data or metadata regarding the immutable data items (e.g. offset and count in the Java String example discussed above).

In some embodiments, de-duplication component 150 may be executing concurrently with one or more other applications, such as application 110, and therefore may be configured to atomically modify pointers to immutable data items. Similarly, in one embodiment, de-duplication component 150 may be configured to atomically update other data and/or metadata when modifying a pointer of an object to point to another immutable data item.

Referring back to FIG. 6, a de-duplication component may continue to iteratively analyze immutable data items until all items have been de-duplicated or ignored (i.e., because they did not correspond to one of the selected candidate groups), as shown in block 650, according to one embodiment.

In some embodiments, as shown in block 250 of FIG. 2, a de-duplication process may include garbage collecting any abandoned immutable data items. In some embodiments, de-duplication of immutable data items may be performed as part of a garbage collection cycle, such as by initially de-duplicating immutable data items before performing garbage collection functions. In other embodiments however, de-duplication of immutable data items may be performed separately and independently from garbage collection cycles. For example, de-duplication component 150 may be configured to execute between successive garbage collection cycles and may further be configured to ensure completion of de-duplication prior to the initiation of the next garbage collection cycle. In some embodiments, de-duplication component 150 may be configured to determine that a garbage collection cycle is about to begin and to stop de-duplication, including possibly abandoning or reversing any in-progress de-duplication efforts. De-duplication component 150 may be configured to discard any temporary data or tables, such histograms, sorted histograms, or temporary tables storing immutable data items, according to various embodiments.

Figure 7:
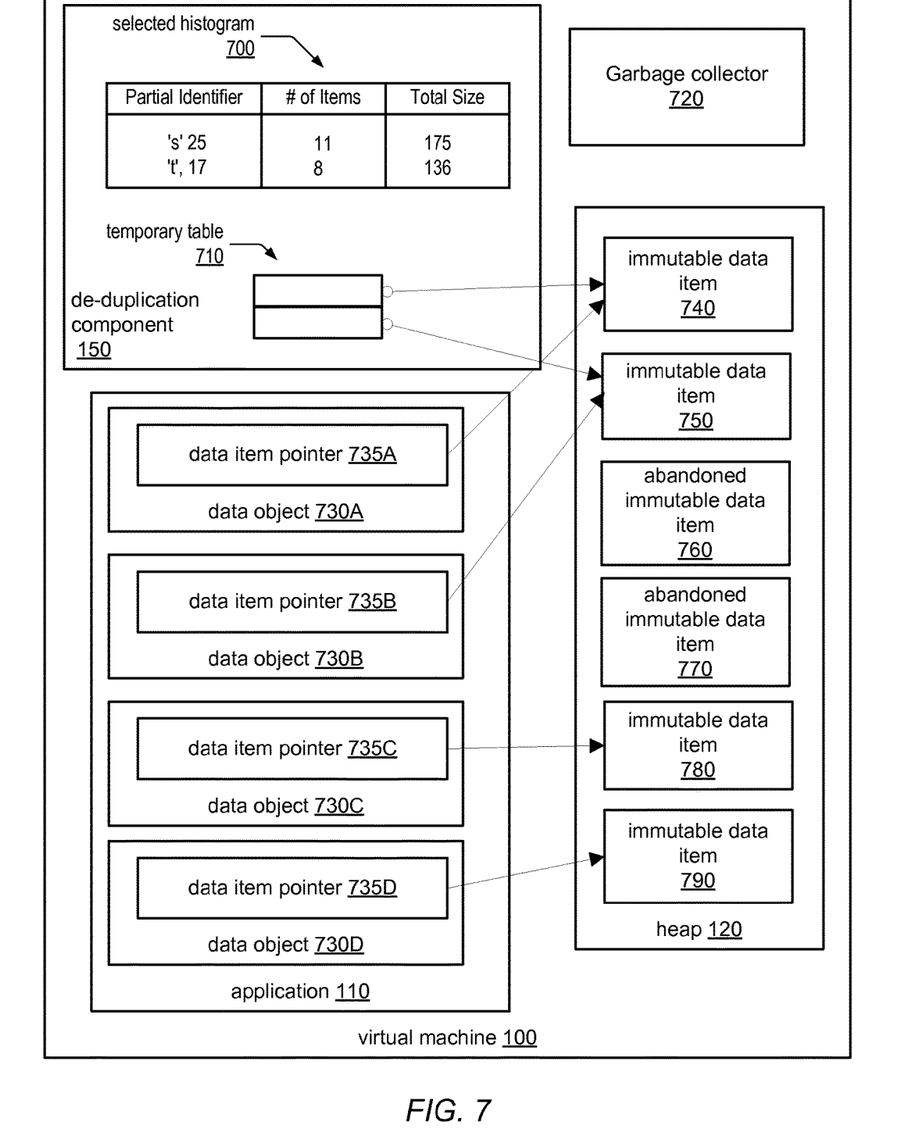
FIG. 7 is a logical block diagram of a virtual machine illustrating, according to one embodiment, de-duplication of immutable items using a histogram and a temporary table, as described herein.

FIG. 7 is a block diagram illustrating according to one embodiment a logical view of de-duplication of immutable items in a virtual machine at runtime, as described herein. As shown in FIG. 7, application 110 executes within virtual machine 100 and includes data objects 730A-730D, each of which include a respective data item pointer 735A-735D. Data item pointer 735A of data object 730A and data item pointer 735B of data object 730B both point to immutable data item 740, thus representing already de-duplicated immutable data items. Data item pointer 735C of data object 730C and data item pointer 735D of data object 730D point to immutable data items 780 and 790, respectively, representing immutable data items that have not been de-duplicated yet, according to one embodiment. Please note that while illustrated in FIG. 7 as logically a part of application 110, data objects 730A-730D may actually be stored within heap 120.

FIG. 7 also illustrates selected histogram 700 and temporary table 710 generated and used by de-duplication component 150 as part of determining that two or more immutable data items have identical content, according to some embodiments. For example, de-duplication component 150 may check to see if a partial identifier for a potentially duplicate immutable data item corresponds to one of the candidate groups represented in selected histogram 700 and if so may then compare the content of the potentially duplicate immutable data item against temporary table 710. If an immutable data item is already present in temporary table 710 that has identical content to the potentially duplicate immutable data item, de-duplication component 150 may then modify a pointer of an object corresponding to the potentially duplicate immutable data item to point to the immutable data item from temporary table 710, in one embodiment. For instance, as shown in FIG. 7, data item pointer 735A in data object 730A points to immutable data item 740, which is shown to be included in temporary table 710.

FIG. 7 further shows abandoned immutable data items 760 and 770 in heap 120 that may no longer be referenced by applications executing in virtual machine 100 and that may, in some embodiments, be garbage collected, such as by garbage collector 720, during a future garbage collection cycle. As described above, in some embodiments, de-duplication component 150 may be separate and independent of garbage collector 720, as shown in FIG. 7, while in other embodiments, de-duplication component 150 may be a part of garbage collector 720.

Figure 8:
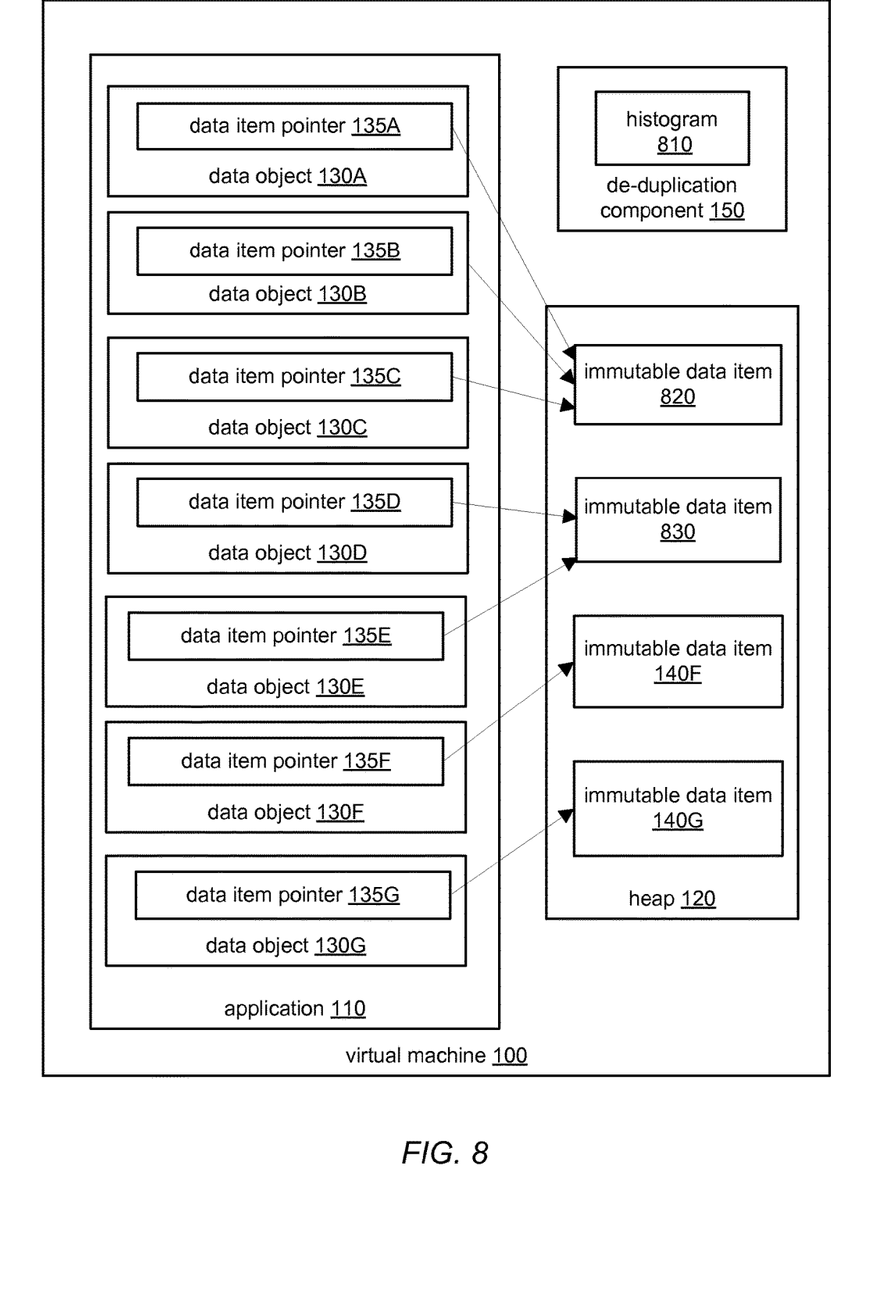
FIG. 8 is a logical block diagram illustrating, according to one embodiment, a virtual machine after de-duplication of immutable data items, as described herein.

FIG. 8 illustrates a logical view, according to one embodiment, of a virtual machine after de-duplication of immutable data items, as described herein. Thus, virtual machine 100 includes application 110 which includes data objects 130A-130G, each of which includes a data item pointer (data item pointers 135A-135G) which point to immutable data items. As shown in FIG. 8, data item pointers 135A-135C point to immutable data item 820, data item pointers 135D and 135E point to immutable data item 830, while data item pointers 135F and 135G point to immutable data items 140F and 140G, respectively and according to one embodiment.

FIG. 8 also illustrates de-duplication component 150, including histogram 810, which according to one embodiment may represent previously de-duplicated immutable data items, as represented by partial identifiers of de-duplicated candidate groups, as described above.

Figure 9:
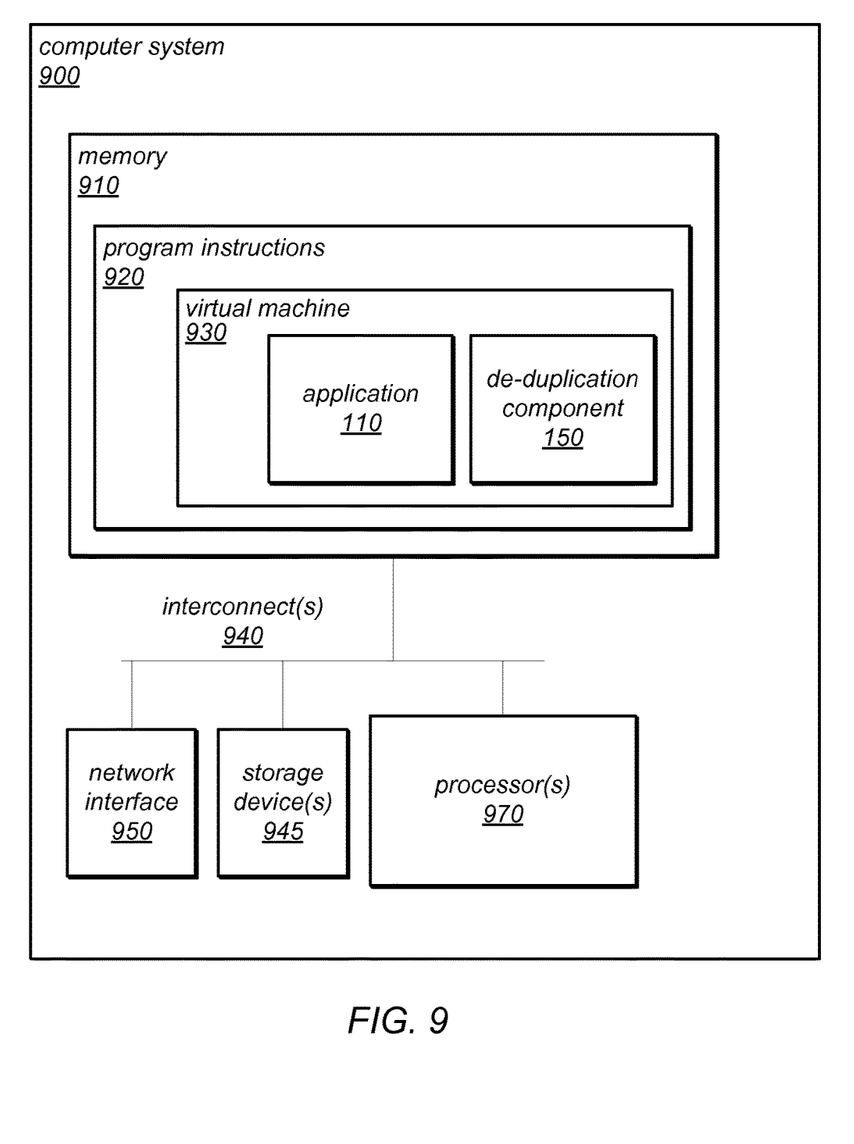
FIG. 9 is a block diagram illustrating one embodiment of a computer system configured to implement de-duplication of immutable items at runtime, as described herein.

The techniques described herein for de-duplication of immutable data at runtime may be implemented in any of a wide variety of computing systems. FIG. 9 illustrates a example computing system that is configured to implement de-duplication of immutable data within a virtual machine, as described herein and according to various embodiments. Computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 900 may include a processor unit 970 (possibly including multiple processors, a single-threaded processor, a multi-threaded processor, a multi-core processor, etc.) which may be configured to execute a virtual machine, such as virtual machine 930 including one or more applications, such as application 110, and de-duplication component 150, which may be present within program instructions 920 stored in memory 910 of the same computer system 900 on which virtual machine 930 is executed or may be present within program instructions stored within a memory of another computer system similar to or different from computer system 900.

The computer system 900 may include one or more system memories 910 (e.g., one or more of cache, SRAM DRAM, RDRAM, EDO RAM, DDR RAM, SDRAM, Rambus RAM, EEPROM, etc.), a system interconnect 940 (e.g., LDT, PCI, ISA, etc.), a network interface 950 (e.g., an ATM interface, an Ethernet interface, a Frame Relay interface, etc.), and one or more storage device(s) 945 (e.g., optical storage, magnetic storage, etc.). The memory medium may include other types of memory as well, or combinations thereof. In other embodiments, computer system 900 may include more, fewer, or different components than those illustrated in FIG. 9 (e.g., video cards, audio cards, additional network interfaces, peripheral devices, etc.). The processor(s) 970, the storage device(s) 945, the network interface 950 and the system memory 910 may be coupled to the system interconnect 940.

One or more of the system memories 910 may include program instructions 920 configured to implement some or all of the techniques described herein for de-duplication of immutable data items in a virtual machine (according to any of the embodiments described herein). For example, one or more of the system memories 910 may include code to implement and/or execute virtual machine 100, application 110 and/or de-duplication component 150, according to one embodiment.

In various embodiments, program instructions 920, virtual machine 100, application 110, de-duplication component 150, and/or individual sub-modules of these components may each be implemented in any of various programming languages or methods. For example, in one embodiment, application 110 and/or de-duplication component 150 may be JAVA based, while in another embodiment, they may be written using the C or C++ programming languages. Similarly, virtual machine 100 may be written using Java, C, C++, or another programming language, according to various embodiments. Moreover, in some embodiments, virtual machine 100, application 110, de-duplication component 150, and various sub-modules of these components may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   performing, by a computer:
      executing one or more applications, wherein the one or more applications comprise a plurality of objects each corresponding to a respective immutable data item, where each object comprises a pointer to the respective immutable data item allocated by the one or more applications in a memory heap of the computer accessed by the one or more applications, wherein each immutable data item is not directly modifiable through the respective corresponding object; and
      performing, by a de-duplication component, a de-duplication process, wherein the de-duplication component is distinct from the one or more applications, and wherein the de-duplication process comprises:
         identifying a set of the immutable data items in the memory heap as potential duplicates;
         determining that two or more of the immutable data items of the set have identical content, wherein two or more of the plurality of objects comprise pointers to different immutable data items having the identical content; and
         for one or more of the immutable data items having identical content, modifying one or more of the pointers of the corresponding objects to point to a same immutable data item.

2. The method of claim 1, wherein the de-duplication component is part of a garbage collector, the method further comprising performing the de-duplication process at each garbage collection cycle of the garbage collector.

3. The method of claim 1, wherein as a result of the de-duplication process at least some of the immutable data items are no longer referenced by the one or more applications and wherein memory for those immutable data items is reclaimed by a garbage collector.

4. The method of claim 1, wherein identifying a set of the immutable data items as potential duplicates comprises grouping the immutable data items into candidate groups as potential duplicates, wherein the immutable data items in each candidate group are potential duplicates of each other.

5. The method of claim 4, wherein identifying a set of the immutable data items as potential duplicates further comprises selecting one or more the candidate groups having a combined data size above a predetermined threshold.

6. The method of claim 4, wherein grouping the immutable data items into candidate groups further comprises:
performing histogram analysis on the immutable data items, wherein each candidate group corresponds to a different bucket of the histogram and wherein the immutable data items of each candidate group have a same partial identifier.

7. The method of claim 6, wherein the partial identifier for each candidate group comprises an initial character and a length, wherein the initial character and length are the same for each immutable data item of the candidate group.

8. The method of claim 4, wherein determining that two or more of the immutable data items of the set have identical content is performed separately for each candidate group.

9. The method of claim 1, wherein identifying a set of the immutable data items as potential duplicates comprises limiting the size of the identified set of the immutable data items to an amount of the immutable data items analyzable within an available heap size available to the de-duplication process.

10. The method of claim 1, wherein modifying one or more of the pointers of the corresponding objects to point to a same immutable data item comprises:
modifying an offset and a length associated with each of the one or more pointers, wherein each modified pointer and its associated offset and length are modified atomically.

11. The method of claim 1, wherein the de-duplication process further comprises:
generating a temporary table of immutable data items; and
comparing each potential duplicate immutable data item from the identified set of immutable data items against immutable data items in the temporary table; wherein as a result of the comparing:
if a potential duplicate immutable data item does not match any immutable data items in the temporary table, adding the potential duplicate immutable data item to the temporary table; and
if a potential duplicate immutable data item matches an immutable data item in the temporary table, modifying the pointer of the object corresponding to the potential duplicate immutable data item to point to the matching immutable data item in the temporary table.

12. The method of claim 1, wherein the de-duplication process is performed independently of a garbage collection mechanism executing on the computer and wherein the de-duplication process is completed between individual cycles of the garbage collection mechanism.

13. The method of claim 1, wherein the de-duplication component is a component of a virtual machine executing on the computer and wherein the one or more applications execute within the virtual machine.

14. The non-transitory, computer-readable storage medium of claim 13, wherein the de-duplication process further comprises:
generating a temporary table of immutable data items; and
comparing each potential duplicate immutable data item from the identified set of immutable data items against immutable data items in the temporary table; wherein as a result of the comparing:
if a potential duplicate immutable data item does not match any immutable data items in the temporary table, adding the potential duplicate immutable data item to the temporary table; and
if a potential duplicate immutable data item matches an immutable data item in the temporary table, modifying the pointer of the object corresponding to the potential duplicate immutable data item to point to the matching immutable data item in the temporary table.

15. A non-transitory, computer-readable storage medium storing program instructions that when executed on one or more computers cause the one or more computers to perform:
executing one or more applications, wherein the one or more applications comprise a plurality of objects each corresponding to a respective immutable data item allocated by the one or more applications in a memory heap of the one or more computers accessed by the one or more applications, wherein each object comprises a pointer to the respective immutable data item, wherein each immutable data item is not directly modifiable through a respective corresponding object; and
performing, by a de-duplication component, a de-duplication process, wherein the de-duplication component is distinct from the one or more applications, and wherein the de-duplication process comprises:
identifying a set of the immutable data items in the memory heap as potential duplicates;
determining that two or more of the immutable data items of the set have identical content, wherein two or more of the plurality of objects comprise pointers to different immutable data items having the identical content; and
for one or more of the immutable data items having identical content, modifying one or more of the pointers of the corresponding objects to point to a same immutable data item.

16. The non-transitory, computer-readable storage medium of claim 15, wherein identifying a set of the immutable data items as potential duplicates comprises grouping the immutable data items into candidate groups as potential duplicates, wherein the immutable data items in each candidate group are potential duplicates of each other.

17. The non-transitory, computer-readable storage medium of claim 16, wherein the program instructions when executed on the one or more computers further cause the one or more computers to perform selecting one or more the candidate groups having a combined data size above a predetermined threshold.

18. The non-transitory, computer-readable storage medium of claim 16, wherein grouping the immutable data items into candidate groups further comprises:
performing histogram analysis on the immutable data items, wherein each candidate group corresponds to a different bucket of the histogram and wherein the immutable data items of each candidate group have a same partial identifier.

19. The non-transitory, computer-readable storage medium of claim 15, wherein the program instructions when executed on the one or more computers further cause the one or more computers to execute a virtual machine, wherein the de-duplication component is a component of the virtual machine and wherein executing the one or more applications comprises executing the one or more applications within the virtual machine.

20. A system, comprising:
one or more processors;
memory coupled to the one or more processors, wherein the memory stores program instructions that when executable on the one or more processors cause the one or more processors to perform:

executing one or more applications, wherein the one or more applications comprise a plurality of objects each corresponding to a respective immutable data item allocated by the one or more applications in a heap memory accessed by the one or more applications, wherein each object comprises a pointer to the respective immutable data item, wherein each immutable data item is not directly modifiable through the respective corresponding object; and performing, by a de-duplication component, a de-duplication process, wherein the de-duplication component is distinct from the one or more applications, and wherein the de-duplication process comprises:
identifying a set of the immutable data items in the memory heap as potential duplicates;
determining that two or more of the immutable data items of the set have identical content, wherein two or more of the plurality of objects comprise pointers to different immutable data items having the identical content; and
for one or more of the immutable data items having identical content, modifying one or more of the pointers of the corresponding objects to point to a same immutable data item.

* * * * *

UNITED STATES PATENT AND TRADEMARK OFFICE
CERTIFICATE OF CORRECTION

PATENT NO. : 10,482,064 B2
APPLICATION NO. : 13/533306
DATED : November 19, 2019
INVENTOR(S) : Dmitriev et al.

Page 1 of 1

It is certified that error appears in the above-identified patent and that said Letters Patent is hereby corrected as shown below:

In the Specification

In Column 11, Line 19, delete "potion" and insert -- portion --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*